United States Patent
Girling et al.

(12) 
(10) Patent No.: US 6,924,803 B1
(45) Date of Patent: Aug. 2, 2005

(54) METHODS AND SYSTEMS FOR A CHARACTER MOTION ANIMATION TOOL

(75) Inventors: Lukas Girling, Nottingham (GB); Scott S. Snibbe, San Francisco, CA (US)

(73) Assignee: Vulcan Portals, Inc., Seattle, WA (US)

( * ) Notice: Subject to any disclaimer, the term of this patent is extended or adjusted under 35 U.S.C. 154(b) by 191 days.

(21) Appl. No.: 09/852,520

(22) Filed: May 9, 2001

Related U.S. Application Data

(60) Provisional application No. 60/205,608, filed on May 18, 2000.

(51) Int. Cl.[7] .............................................. G06T 15/00
(52) U.S. Cl. ..................................................... 345/473
(58) Field of Search .............................. 345/690, 433, 345/114, 473

(56) References Cited

U.S. PATENT DOCUMENTS

| | | | | |
|---|---|---|---|---|
| 4,600,919 A | * | 7/1986 | Stern ........................... | 345/473 |
| 5,719,593 A | * | 2/1998 | De Lange .................... | 345/422 |
| 5,844,569 A | * | 12/1998 | Eisler et al. ................ | 345/619 |
| 6,237,025 B1 | * | 5/2001 | Ludwig et al. ............. | 709/204 |

OTHER PUBLICATIONS

Coco, Donna, A Web Developer's Dream, Aug. 1998, Computer Graphics World, vol. 21, pp. 1-5.*

Bruce Damer, Avatars! Exploring and Building Virtual Worlds on the Internet, 1998, v Peachpit Press, pp. 288-289, 438, 443 http://www.digitalspace.com/avatars/book/fullbook/index.htm.*

3DCreate Help Files, 1997, pp. 1-24.*

* cited by examiner

*Primary Examiner*—Almis R. Jankus
(74) *Attorney, Agent, or Firm*—VanPelt, Yi & James LLP

(57) ABSTRACT

A method and system for creating an object or character in a drawing window and simultaneously displaying the object or character in animated form wherein the animated form is available for instant playback or feedback to the user is described. A single process is used for creating the object and animating the object. The user is able to draw the object in a drawing window and have the object animated in an animation window as the object is being drawn, thereby allowing the user to immediately see the results of the animation. A single process is used to create the object or character (i.e., the "drawing" stage) and to display the object in animated form. The drawing and animation can be shown side-by-side for the user thereby enabling the user to see the animation of a character that the user had created moments before. The animation can take place in an animation window or be placed in a pre-existing context, such as an ongoing story line or a collaborative community context created by multiple users.

12 Claims, 5 Drawing Sheets

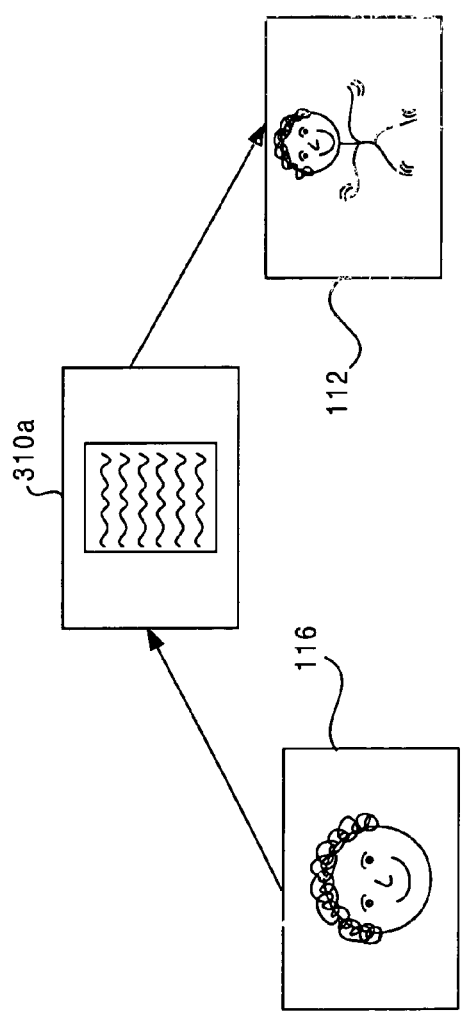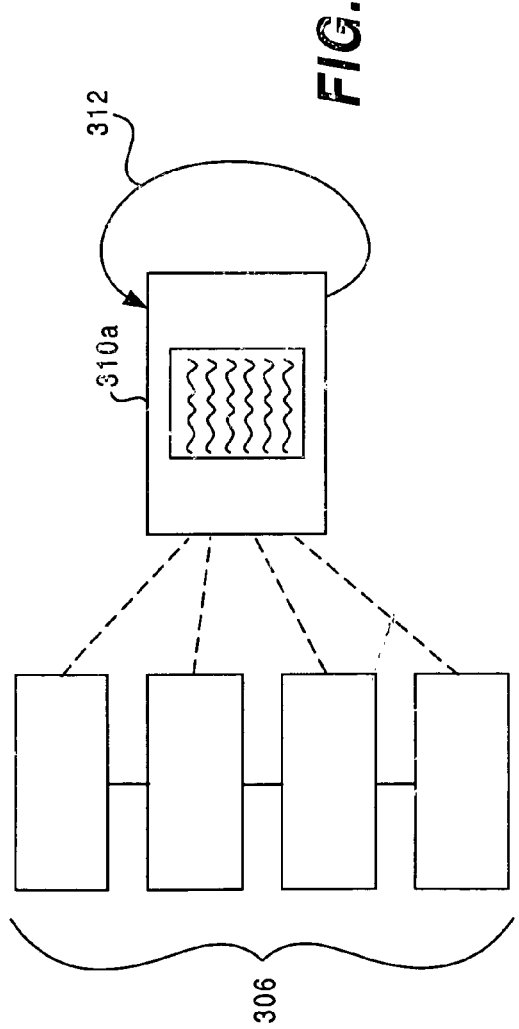

METHODS AND SYSTEMS FOR A CHARACTER MOTION ANIMATION TOOL

CROSS REFERENCE TO RELATED APPLICATIONS

This application claims priority to Provisional U.S. patent application No. 60/205,608 filed May 18, 2000 entitled, ONLINE COLLABORATIVE MEDIA FRAMEWORK, the disclosure of which is incorporated by reference herein in its entirety. This application is related to U.S. patent application No. 09/828,491 filed Apr. 4, 2001 entitled, System and Methods for Collaborative Digital Media Development, the disclosure of which is incorporated by reference herein in its entirety.

BACKGROUND OF THE INVENTION

The present invention relates to the creation of digital media in a computer network environment. In particular, the invention relates to systems and methods for development of animated characters and digital media.

Digital media content developers, professionals and amateurs alike, are not immune from the desire of instant gratification from their creative efforts. However, with current animation tools, digital content, such as comic book-type characters, can take several hours, days or even weeks for an author to view what he or she has created. For example, a professional animator must animate for many hours or days, frame-by-frame before he or she can play back the final result to see the fruits of their labor. Similarly, a regular consumer, taking part in a media contest must wait many weeks or months to see whether their idea is the winner of a contest and then wait for the professional execution of the idea.

It would be more productive for creators of digital content to obtain instant feedback on what they have created. By providing instant feedback from animation tools, for example, authors can make improvements to their work as they create them or experiment without being inefficient or unproductive. Animators, for example, would like to see the characters they create in motion as the characters are created. The benefits to such an animation tool are obvious: instant feedback, an enhanced creative process, and increased productivity. This is also true for non-professionals who have taken an avocational interest in animation whether for personal use or for use in more public forums, such as collaborative community settings. Such non-professional users, such as members of a television show audience or visitors/contributors to an animation web site, can offer their animated creations as potential contributions to a story line, a competition or other context. These types of users or consumers would also benefit greatly from the instant feedback and playback of their animation and the enhanced creative process such animation tools could provide.

Digital media content, such as animation, is typically created by a single author or a comparatively small creative team and delivered to a mass audience. A general audience's ability to consume and produce such media content is highly asymmetrical, in that the audience often views such content, yet rarely creates it. Currently, there are few systems or tools for people to create media with anything approaching the ease with which it is viewed and heard. Therefore, it would further enhance the creative process involved in creating such digital media content if an animation tool that provides instant feedback also allows the audience to create its own original characters.

Thus, an improved digital media creation and production tool that addresses these issues is needed.

SUMMARY OF THE INVENTION

The present invention addresses the above problems by providing a tool for creating animated characters and objects and being able to view a character or object in an animated form as it is being created. The tool effectively provides animators with instant feedback on their animation, thereby allowing them to experiment with creative ideas and produce final media content more efficiently. Furthermore, regular consumers can get an instant sense of gratification from being able to immediately see their amateur contributions brought to life with this tool. Opening up animation to a broad class of media consumers allows media companies to engage their audience with highly interactive experiences. A single process is used to create the object or character (i.e., the "drawing" stage) and to display the object in animated form. The drawing and animation can be shown side-by-side for the user thereby enabling the user to see the animation of a character that the user had created moments before. The animation can take place in an animation window or be placed in a pre-existing context, such as an ongoing story line or a collaborative community context created by multiple users.

In one aspect of the present invention a method of creating animation in a computer system is described. A static object is created in a drawing window where the object has one or more components. While the object is being composed by a user, the object is displayed simultaneously in an animation window in an animated manner. This is done such that as a component of the object is drawn in the drawing window, the component is animated with the rest of the object in the animation window. This allows the user to playback the animation of the object immediately after drawing it. In one embodiment, the object is animated in first scenario, such as a collaborative community environment and the object is a character developed by a user. In another embodiment, a representation of the object or component is placed in a drawing buffer as the component is being drawn. The representation is then transmitted to an animation buffer and then displayed in an animated manner in the animation window. In another embodiment the representation of the object is placed in a shared buffer and displayed directly from the shared buffer in the animation window. In yet another embodiment, data corresponding to position, orientation and scale of the component at a given time is determined. This data is then stored in a buffer and searched for at a later time. The component is then placed based on this data in an animation window.

In another aspect of the present invention, a method of displaying animation as components in the animation are being created is described. A component is drawn in a drawing window where the drawing window occupies one portion of a user interface displayed on a computer screen. The component is then displayed as part of an animated object in an animation window, where the animation window occupies a second portion of the user interface displayed on the computer screen. In this screen configuration, the component is shown with the animated object while the component is drawn and the two portions of the user interface are displayed simultaneously.

Another aspect of the invention pertains to computer program products including a machine readable medium on which is stored program instructions for implementing any of the methods described above. Any of the methods of this invention may be represented as program instructions that can be provided on such computer readable media.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4A is a diagram showing a single buffer receiving data from drawing window and transmitting the data to animation window in accordance with one embodiment of the present invention.

FIG. 4B is a diagram showing continuous animation being performed from the animation window buffer in accordance with one embodiment of the present invention.

DETAILED DESCRIPTION OF SPECIFIC EMBODIMENTS

Reference will now be made in detail to some specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides tools for working both individually and collaboratively in producing a digital media artifact. These tools of the invention include a variety of systems and methods that support creativity including, in particular, a structured collaborative digital media creation environment. The present invention may be applied to enable communities to create full and partial digital media products.

Figure 1:
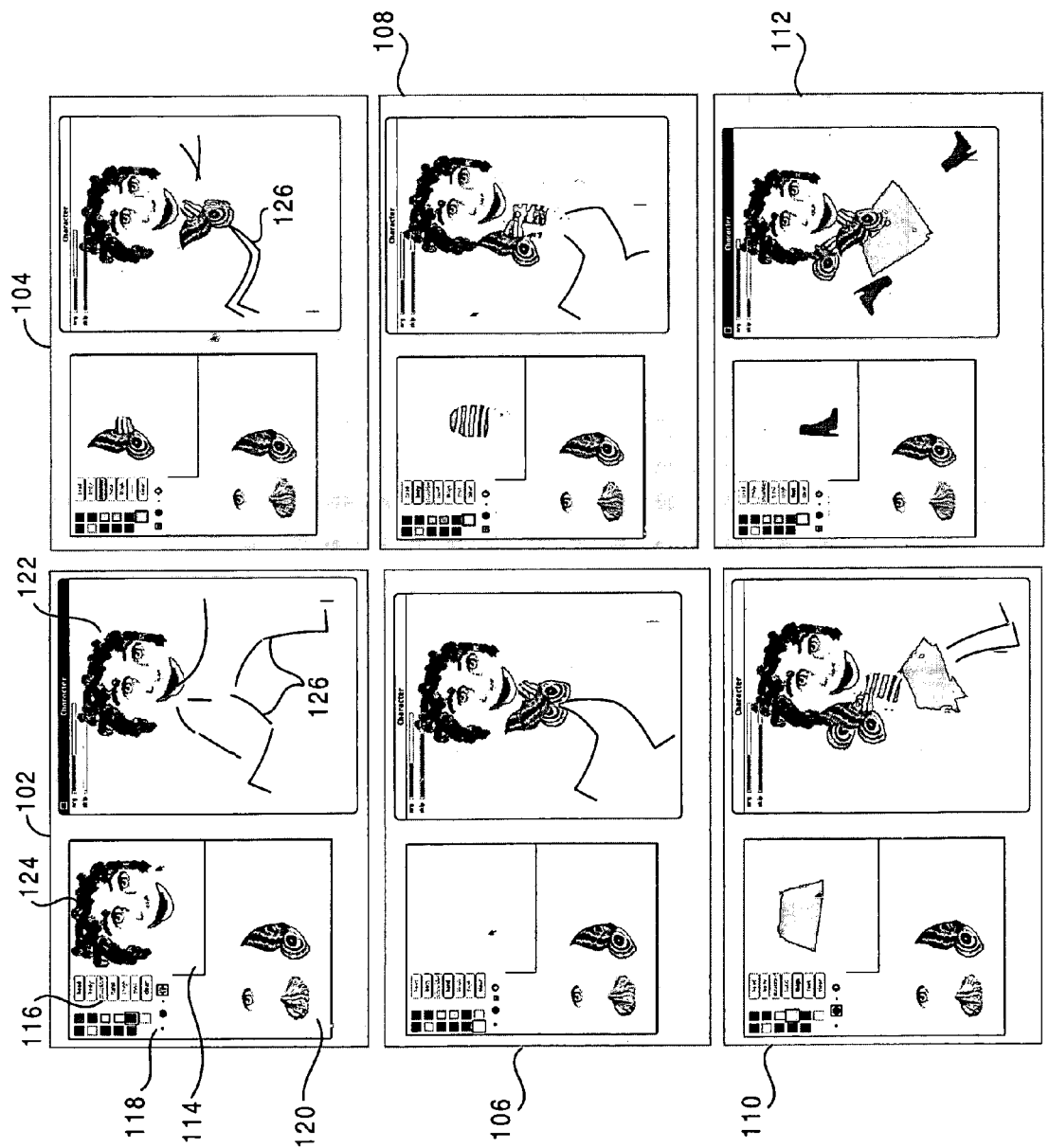
FIG. 1 is a series of screen shots illustrating an instant animation feedback feature in accordance with one embodiment of the present invention.

FIG. 1 is a series of screen shots illustrating an instant animation feedback feature in accordance with one embodiment of the present invention. As described above, the process of authoring media or, specifically, animation is normally separate from the process of playback; that is, viewing the results of the creative process. Shown in FIG. 1 are six screen shots beginning with screen 102 and ending with screen 112. Screens 102 to 112 have similar sections (using screen shot 102 as an example): a drawing window 114, a component or part list 116, a color and drawing instrument template 118, a "rubber stamp" template 120, and an animation window 122. An animator or user (e.g., a member of the general audience) selects a part from list 116. In the described embodiment, the parts correspond to different parts of a human body, but can correspond to parts of other types of objects or animals such as car parts, parts of different breeds of dogs, etc. In screen 102 the user selected the "Head" body part and has drawn a head and face 124 in drawing window 114. As the part is drawn, the image is animated in window 122. Also shown in window 122 are outlines 126 of other parts of the body, such as the legs, shoulders and arms. It should be noted that the image, such as the head, and the body outline are in motion or animated in window 122.

In screen shot 104 the user has dragged a previously created image or rubber stamp from area 120 into drawing window 114. Once each stroke or action is completely in window 114, it is instantly added to the animated image in window 122, in this example as a shoulder to the figure. As mentioned above, this image is also in motion, as indicated by the different position of the outline of the legs 126. This process is repeated as many times as desired by the user until an animated character is created, as shown in screen shot 112. Each body part or rubber stamp image is added to the image-in-progress shown in animation window 114. The user is able to add parts or components to the image that he or she may not normally have added and get instant feedback as to how the animated character will look and move. The user can delete the body part if he or she decides to do so and continue the creative process, without having to wait for results from the animation at a later time.

Technical implementation of the systems and methods of the present invention may be achieved using a variety of different existing hardware and software tools as will be apparent to one of skill in the art upon reading the present disclosure. Technical implementation details are provided herein only to the extent necessary to enable one of skill in the art to practice the invention.

Figure 2:
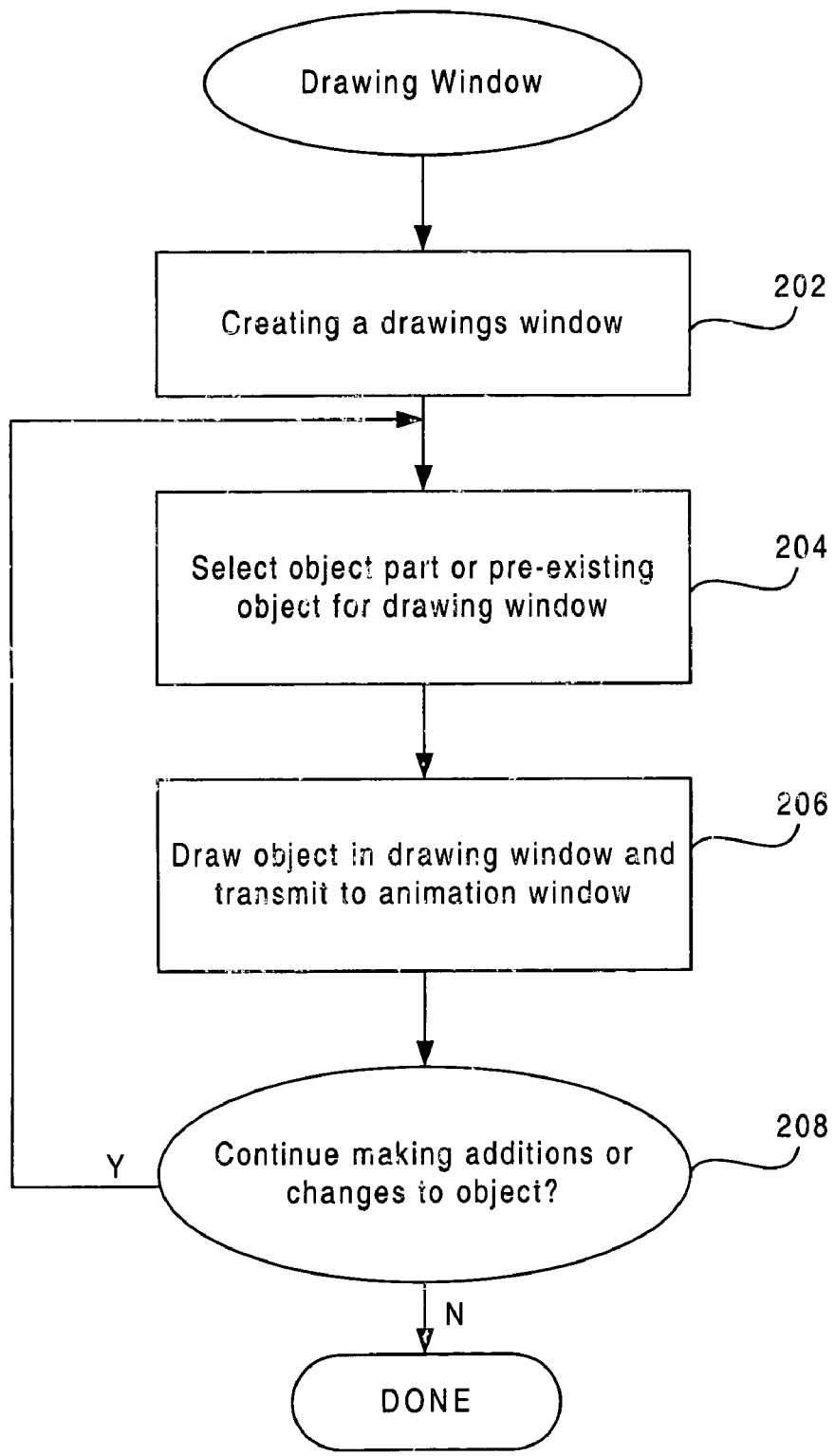
FIG. 2 is a flow diagram of a process of creating an image in a drawing window in accordance with one embodiment of the present invention.

FIG. 2 is a flow diagram of a process of creating an image in a drawing window in accordance with one embodiment of the present invention. At a step 202 a drawing window is created. In the described embodiment the drawing window is used to create in effect a puppet or a new character that fits an existing animation. An animation window may also be created at the same time as the drawing window or at a different time. Creation of the animation window is described in FIG. 3.

At step 204 the user selects a component or a previously created object (i.e., a graphical "rubber stamp") to place in the drawing window. Following the illustration in FIG. 1, this component or object part can be one part of a human body such as shoulders or legs. As is known in the field of graphics applications, the component is typically a stored image or a previously created image taken from a buffer or a blank image. The image can be in any industry-standard format such as a bitmap image, a vector-based image (e.g., Macromedia Flash™ content), or a three-dimensional object. In the described embodiment, selecting an object part involves choosing a component from list 116 or dragging a previously created image from area 120 of FIG. 1.

At step 206 the user draws the object in the drawing window and thereby transmits the object being drawn to the animation window. The user can use one of several drawing implements and colors shown in area 118 to draw the actual component. In the described embodiment, the object being drawn is transmitted to the animation window upon a "mouse up" or mouse release by the user. Essentially, the portion of object is transmitted to the animation window upon each brush stroke by the user. In another preferred embodiment, the image can be transmitted continually to the animation window as the object is being drawn. The method in which the animation window is updated is an issue of User Interface requirements, bandwidth and CPU.

Figure 3A:
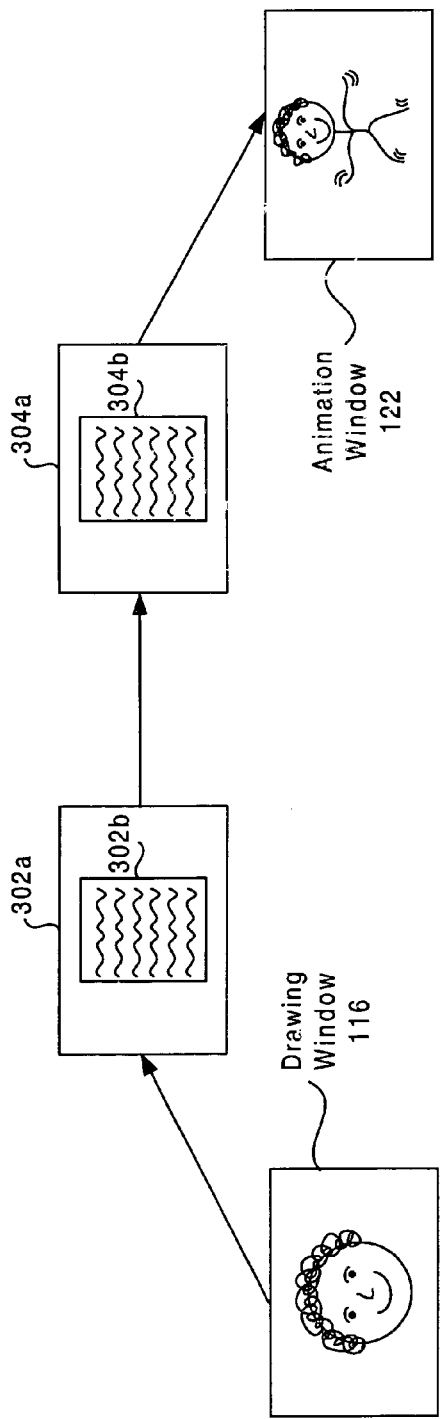
FIG. 3A is a diagram showing each window having its own buffer for storing and updating images in accordance with one embodiment of the present invention.
Figure 3B:
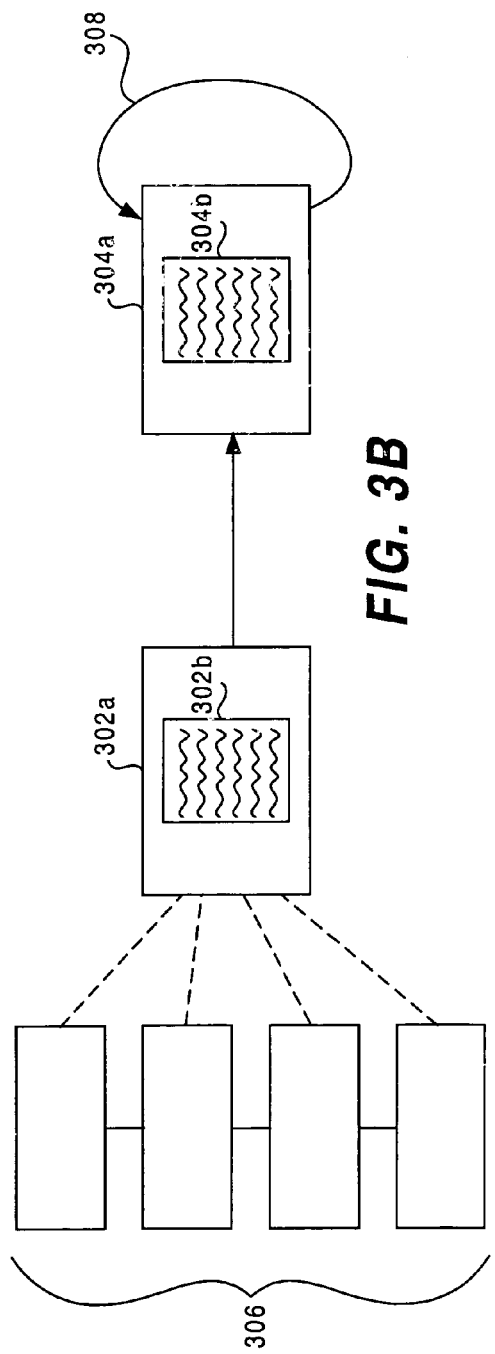
FIG. 3B shows a process of updating the animation window using two buffers in accordance with one embodiment of the present invention.

In the described embodiment, the animation window and the drawing window use separate buffers to store the image or model of the animated parts. In another preferred embodiment, both windows share the same buffer in which case the animation window is updated continually as the object is being drawn in the drawing window. These two embodiments are described in FIGS. 3A and 3B. FIG. 3A is a diagram showing each window (or user interface component) having its own buffer for storing and updating the images or models of the animated component parts. Drawing window 116 and animation window 122 are the same as those shown in FIG. 1. Objects drawn in drawing window 116 are stored in buffer 302a as data structure 302b. Data structure 302b is transmitted to animation window buffer 304a. Animation window 122 takes data in structure 304b in animation window buffer 304a and displays the animation to the user as the user is drawing the object. A process of updating the animation window using two buffers is shown in FIG. 3B. A series of drawing windows 306, each window containing updated content over time, updates drawing window buffer 302a and structure 302b. These updates are transmitted to buffer 304a from which animation shown in window 122 of FIG. 1 is continually performed as indicated by looping arrow 308.

FIG. 4A is similar to FIG. 3A except that a single buffer 310a is shown receiving data from drawing window 116 and transmitting the data to animation window 1112. FIG. 4B is a diagram showing the continuous animation being performed from the animation window buffer 310a as indicated by looping arrow 312.

Continuing with FIG. 2, at step 208 the user decides whether she wants any other components or rubber stamps from list 116 or area 120 to be included in the drawing. If so, the user returns to step 204 and selects the next component or object part for the drawing window. Once selected, the user draws the object in the drawing window and transmits the drawing to the animation window as described in step 206. If there are no other components or rubber stamps, the process of creating an animated character or object is complete.

Figure 5:
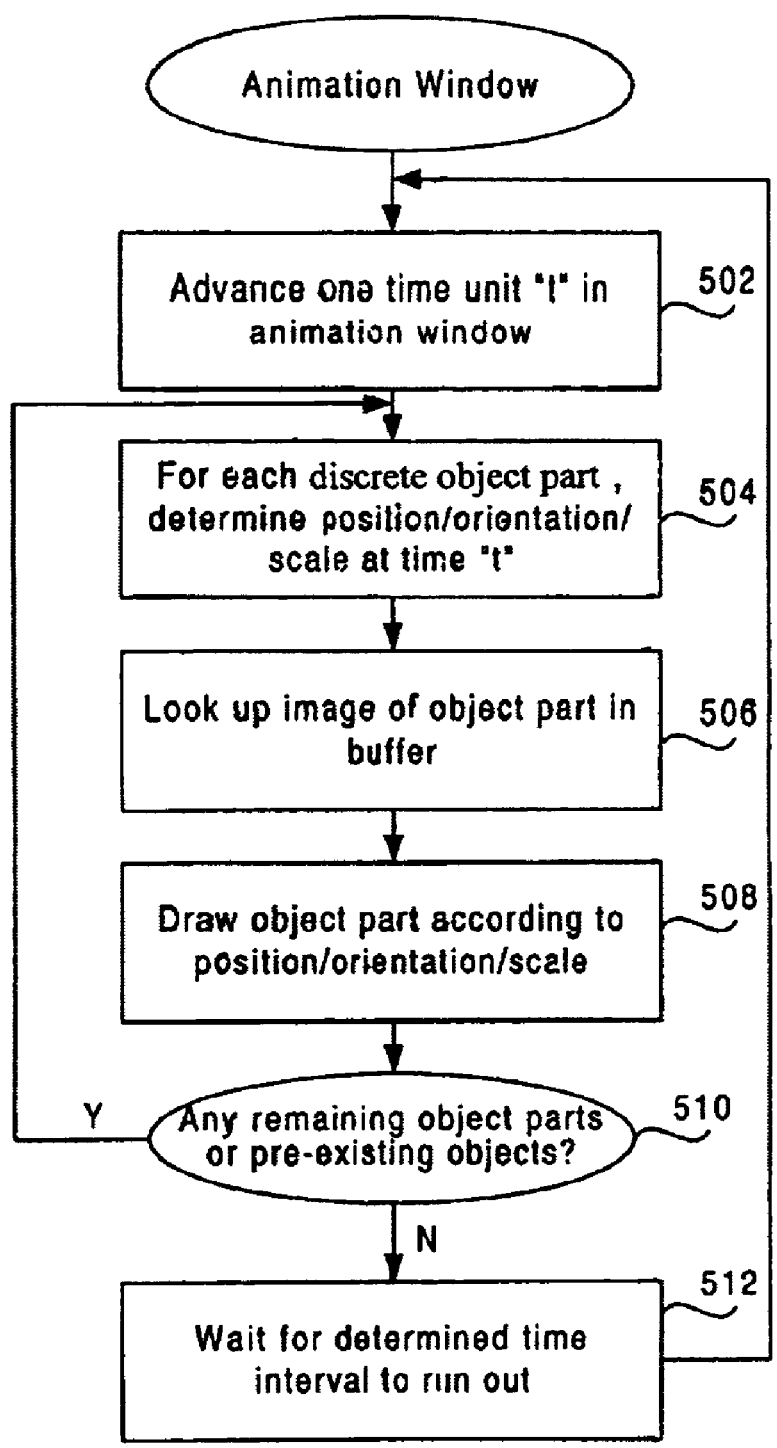
FIG. 5 is a flow diagram of a process of creating animation from a drawing in accordance with one embodiment of the present invention.

As described above, the present invention allows the user to see in near real-time the animation created from the drawing. As components are added, the animation is created in window 122 as shown in FIG. 1. FIG. 5 is a flow diagram of a process of creating animation from a drawing in accordance with one embodiment of the present invention. At step 502 a single time unit t is started or advanced in the animation window. The value for t can be any suitable time unit for the type or speed of animation desired.

At step 504 the position/orientation/scale data for each discrete object part or component selected by the user is determined at time t. As is known in the field of graphics programming, position/orientation/scale data is data typically needed of an object for creating animation. In addition to position/orientation/scale, there are an arbitrary number of other properties that can vary from frame-to-frame including opacity, distortion, etc. Various methods such as key frame and parametric methods can be used to determine the value of an animated property at the given time t. With key frame animation all positions of parts of an object are defined by an animator at the time of creation and stored in a table of values, indexed by time. A parametric method involves a function or algorithm that determines movement or animation at any time t and the parameters to the animation can change to reflect different qualities of motion. Many other techniques can be used and the invention can be applied with any technique for animating objects with a computer.

At step 506 the animation engine finds or looks-up the image associated with the component on the screen in the shared buffer or the drawing buffer. The animation program then draws the object in the animation window according to the position/orientation/scale of the object using. Methods in which the object is drawn in the animation window are shown in FIGS. 3B and 4B.

At step 510 the animation engine determines whether there are any remaining objects parts or components in the shared buffer or drawing buffer. If there are, control returns to step 504 where the position/orientation/scale of the next object part or component is determined and the process is repeated for the next object part. If there are no more components to be drawn in the animation window, the system waits for the determined time interval to run out at step 512. Given that drawing the object part in the animation window as in step 508 may not consume all the time in the time frame, the system waits for the frame to run its full length before going to the beginning of the next frame or the first frame (e.g., when the animation is ongoing and has no pre-determined ending). Once the current time frame runs to its end, the animation window is advanced one time unit t and the process is repeated.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of creating animation in a computer system, the method comprising:

creating a static object in a drawing window wherein the object has one or more components and wherein a representation of a component of the object is placed in a drawing buffer as the component is being drawn;

transmitting the representation to an animation buffer;

displaying the object in an animation window in an animated manner based at least in part on the representation in the animation buffer, such that as the component of the object is being drawn in the drawing window the object is animated and displayed simultaneously in an animation window in the form of an animated object; and continually updating the animated object displayed in the animation window with data from the drawing window.

2. A method as recited in claim 1 further comprising selecting the component from a preexisting set of components available to be placed in the drawing window.

3. A method as recited in claim 1 further comprising displaying the component in the animation window upon the release of a pointer device.

4. A method as recited in claim 1 wherein the drawing buffer is a first buffer, the animation buffer is a second buffer and the method further comprises:
- determining data corresponding to position, orientation, and scale of the component at a given time and storing said data in a third buffer;
- searching in the third buffer for said data; and
- placing the component in the animation window based on said data.

5. A method as recited in claim 1 wherein creating the object and displaying the object simultaneously in an animation window in an animated manner both occur in a single process.

6. A method as recited in claim 1 further comprising using a plurality of drawing implements and modeling techniques to create the object.

7. A method of creating animation in a computer system, the method comprising:
- creating a static object in a drawing window wherein the object has one or more components and wherein a representation of a component of the object is placed in a shared buffer;
- displaying the object in an animation window in an animated manner directly from the shared buffer, such that as a component of the object is being drawn in the drawing window the object is animated and displayed simultaneously in an animation window in the form of an animated object; and
- continually updating the animated object displayed in the animation window with data from the drawing window.

8. A method as recited in claim 7 further comprising selecting the component from a pre-existing set of components available to be placed in the drawing window.

9. A method as recited in claim 7 further comprising displaying the component in the animation window upon the release of a pointer device.

10. A method as recited in claim 7 wherein the shared buffer is a first buffer and the method further comprises:
- determining data corresponding to position, orientation, and scale of the component at a given time and storing said data in a second buffer;
- searching in the second buffer for said data; and
- placing the component in the animation window based on said data.

11. A method as recited in claim 7 wherein creating the object and displaying the object simultaneously in an animation window in an animated manner both occur in a single process.

12. A method as recited in claim 7 further comprising using a plurality of drawing implements and modeling techniques to create the object.

* * * * *